(12) United States Patent
Li et al.

(10) Patent No.: US 11,074,902 B1
(45) Date of Patent: Jul. 27, 2021

(54) OUTPUT OF BABBLE NOISE ACCORDING TO PARAMETER(S) INDICATED IN MICROPHONE INPUT

(71) Applicant: Lenovo (Singapore) Pte. Ltd., Singapore (SG)

(72) Inventors: Scott Wentao Li, Cary, NC (US); Robert Norton, Raleigh, NC (US); Russell Speight VanBlon, Raleigh, NC (US); Robert J. Kapinos, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/794,116

(22) Filed: Feb. 18, 2020

(51) Int. Cl.
*H04R 3/02* (2006.01)
*G10K 11/175* (2006.01)
*G10L 15/00* (2013.01)
*G10L 25/51* (2013.01)
*G10L 15/24* (2013.01)
*H03G 3/00* (2006.01)
*H04L 29/06* (2006.01)

(52) U.S. Cl.
CPC .......... *G10K 11/175* (2013.01); *G10L 15/005* (2013.01); *G10L 15/24* (2013.01); *G10L 25/51* (2013.01); *H04L 65/80* (2013.01)

(58) Field of Classification Search
CPC ..... G10K 11/175; G10L 15/005; G10L 15/24; G10L 25/51; H04L 65/80
USPC .................................................. 381/73.1, 61
See application file for complete search history.

(56) References Cited

U.S. PATENT DOCUMENTS

2013/0259254 A1* 10/2013 Xiang .................. G10K 11/175
381/73.1
2017/0026769 A1* 1/2017 Patel ........................ H04R 5/04

OTHER PUBLICATIONS

"Babble Noise—Freequency Shaped Babble Noise Generator", Babble Noise Background Generator, retrieved Jan. 23, 2020 from https://mynoise.net/NoiseMachines/babbleNoisegenerator.php.

* cited by examiner

*Primary Examiner* — Ammar T Hamid
(74) *Attorney, Agent, or Firm* — John M. Rogitz; John L. Rogitz (57) ABSTRACT

In one aspect, a device may include at least one processor and storage accessible to the at least one processor. The storage may include instructions executable by the at least one processor to receive input from at least one microphone accessible to the at least one processor and, based at least in part on the input, identify at least a first parameter related to sound indicated in the input. The instructions may also be executable to, based on the first parameter, output first babble noise via at least one speaker accessible to the at least one processor.

20 Claims, 5 Drawing Sheets

OUTPUT OF BABBLE NOISE ACCORDING TO PARAMETER(S) INDICATED IN MICROPHONE INPUT

FIELD

The present application relates to technically inventive, non-routine solutions that are necessarily rooted in computer technology and that produce concrete technical improvements.

BACKGROUND

As recognized herein, in open-office environments with cubicles and such, a voice over internet protocol (VoIP) telephone call that a person might conduct over the Internet can often be overheard by others since the person's headset typically does not block sound from emanating beyond the headset's microphone itself nor is the Internet cable of blocking the sound locally as spoken by the person. As also recognized herein, this can lead to other people within the office being distracted from their own tasks by the VoIP telephone call. Indeed, even attempting to disregard such speech can be a difficult task. There are currently no adequate solutions to the foregoing computer-related, technological problem.

SUMMARY

Accordingly, in one aspect a device includes at least one processor and storage accessible to the at least one processor. The storage includes instructions executable by the at least one processor to receive input from at least one microphone accessible to the at least one processor and, based at least in part on the input, identify at least a first parameter related to sound indicated in the input. The instructions are also executable to, based on the first parameter, output first babble noise via at least one speaker accessible to the at least one processor.

In some examples, the input from the at least one microphone may be first input from the at least one microphone, the first input may be received at a first time, and the instructions may be executable by the at least one processor to receive, at a second time, second input from the at least one microphone. The second time may be different from the first time. Also in these examples the instructions may then be executable to, based at least in part on the second input, identify at least a second parameter related to sound indicated in the second input, where the second parameter may be different from the first parameter. In these examples the instructions may then be executable to, based on the second parameter, output second babble noise via the at least one speaker, where the second babble noise may be different from the first babble noise. The first parameter may be speech in a first language, the second parameter may be speech in a second language different from the first language, the first babble noise may be related to speech in the first language, and the second babble noise may be related to speech in the second language. Additionally or alternatively, the first parameter may be speech in a first frequency band, the second parameter may be speech in a second frequency band different from the first frequency band, the first babble noise may be related to speech in the first frequency band, and the second babble noise may be related to speech in the second frequency band. Additionally or alternatively, the first parameter may be speech at a first volume level, the second parameter may be speech in a second volume level different from the first volume level, the first babble noise may be related to speech in the first volume level, and the second babble noise may be related to speech in the second volume level.

In some implementations, babble noise may be established at least in part by indistinguishable background speech of multiple people. The first babble noise may be prerecorded and/or generated dynamically using audio editing software. Additionally, in some implementations the device may include the at least one microphone.

Still further, in some examples the input from the at least one microphone may be first input from the at least one microphone, the first input may be received at a first time, and the instructions may be executable by the at least one processor to receive, at a second time, second input from the at least one microphone accessible to the at least one processor. The second time may be different from the first time. In these examples, the instructions may then be executable to identify from the second input a reduction in sound relative to sound indicated in the first input, and to reduce the volume level of the first babble noise based on the identification of the reduction in sound. The reduction in sound may be a lack of sound, and the reduction in volume level of the first babble noise may include ceasing to output the first babble noise via the at least one speaker. Ceasing to output the first babble noise via the at least one speaker may include ceasing to output any sound via the at least one speaker.

In another aspect, a method includes receiving, at a device, input from at least one microphone. The method also includes using the device to identify at least a first parameter related to sound indicated in the input based at least in part on the input, and then outputting first crowd noise via at least one speaker accessible to the device based on the first parameter.

In some examples, the first parameter may relate to speech in a first language and the first crowd noise may use speech in the first language. Additionally or alternatively, the first parameter may relate to speech in a first frequency band of 85 Hz to 180 Hz and the first crowd noise may be output in the first frequency band. The first parameter may also relate to speech in a first frequency band of 165 Hz to 255 Hz and the first crowd noise may be output in the first frequency band. The first parameter may also relate to speech in a first frequency band of 250 Hz to 300 Hz and the first crowd noise may be output in the first frequency band. Still further, in addition to or in lieu of the foregoing, the first parameter may relate to speech at a first volume level and the first crowd noise may be output at a second volume level matching the first volume level to within a threshold.

In still another aspect, at least one computer readable storage medium (CRSM) that is not a transitory signal includes instructions executable by at least one processor to receive input from at least one microphone accessible to the at least one processor and to, based at least in part on the input, identify at least a first parameter related to sound indicated in the input. The instructions are also executable to, based on the first parameter, output first babble noise via at least one speaker accessible to the at least one processor.

If desired, in some implementations the instructions may also be executable to, based at least in part on the input, identify first, second, and third parameters related to sound indicated in the input. The first parameter may be related to speech in a first language, the second parameter may be related to speech in a first frequency band, and the third parameter may be related to speech at a first volume level as sensed by the at least one microphone. In these implementations, the instructions may then be executable to, based on the first, second, and third parameters, output the first babble noise via at least one speaker to correspond to the first, second, and third parameters.

The details of present principles, both as to their structure and operation, can best be understood in reference to the accompanying drawings, in which like reference numerals refer to like parts, and in which:

DETAILED DESCRIPTION

The present application recognizes that babble noise may be used for masking or distracting from speech that is being overheard by a person. Furthermore, compared to white noise, babble noise may offer a higher efficiency when it comes to camouflaging speech in particular since it uses the indistinguishable voices of others to help make the speech itself also indistinguishable. Thus, this may allow lower masking levels to be used while ensuring the same masking efficiency.

Accordingly, among other things the present application discloses using a dynamic babble noise generation process. The process may involve use of environmental noise measurement/characteristics as input. The characteristics may include ambient sound levels and/or speech amplitude/levels, frequency domain characteristics, and language characteristics. Babble masking noise may then be dynamically generated and optimized based on those characteristics.

For example, dynamically generated babble noise may match environment noise level and frequency domain energy, while also transitioning to a language that is appropriate for masking speech also in that language when ambient conversation occurring in English switches to Chinese. Thus, the babble noise may change from English-based to Chinese-based as the people switch to speaking Chinese or as a noise source changes (e.g., entirely new conversation between different people occurring in Chinese).

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/Javascript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
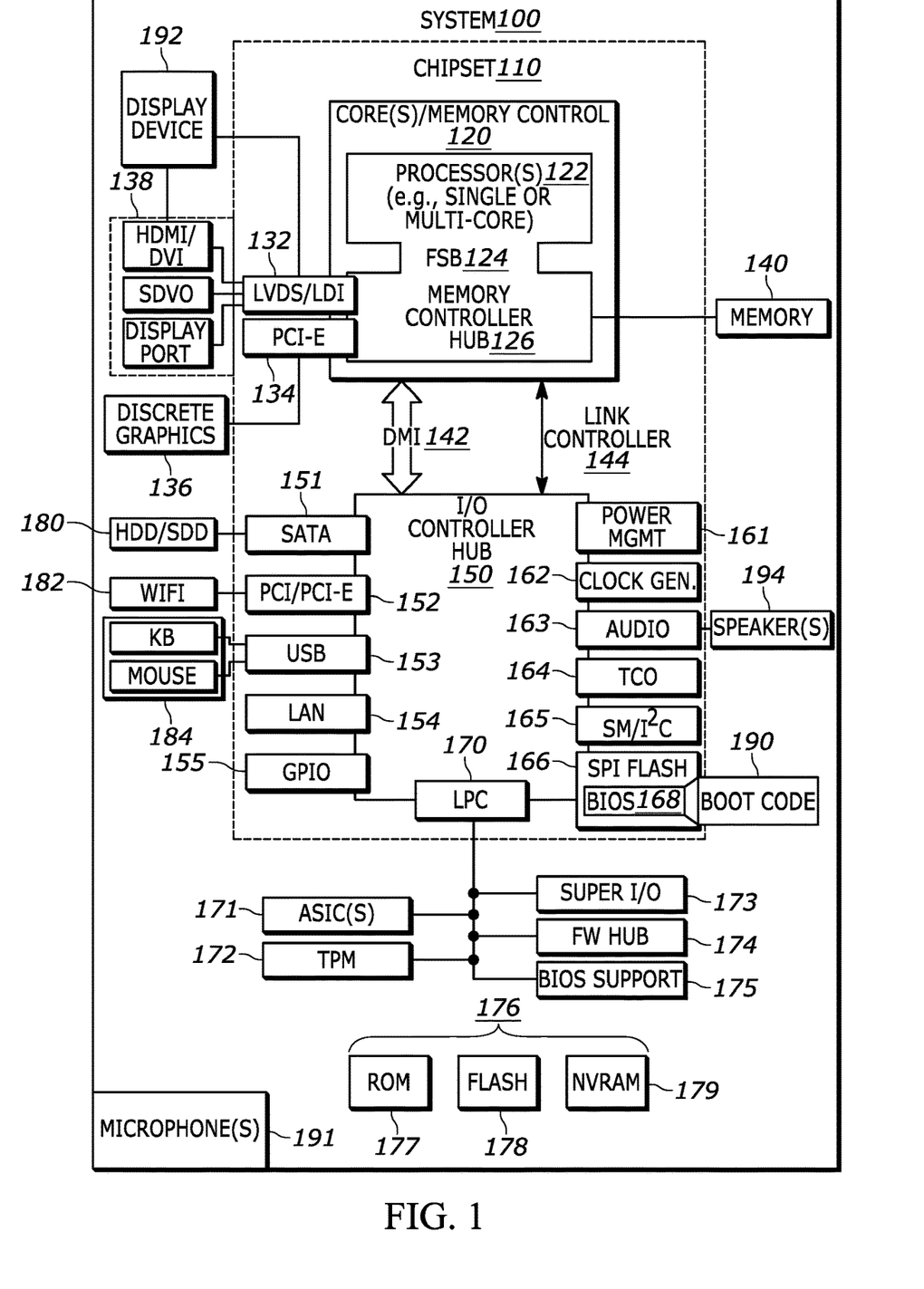
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include at least one microphone or a microphone array 191 that may provide input from the microphone/array 191 to the processor 122 based on audio that is detected by the microphone/array 191 consistent with present principles, such as one or one oral conversations by one or more groups of people. Still further, though not shown for simplicity in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
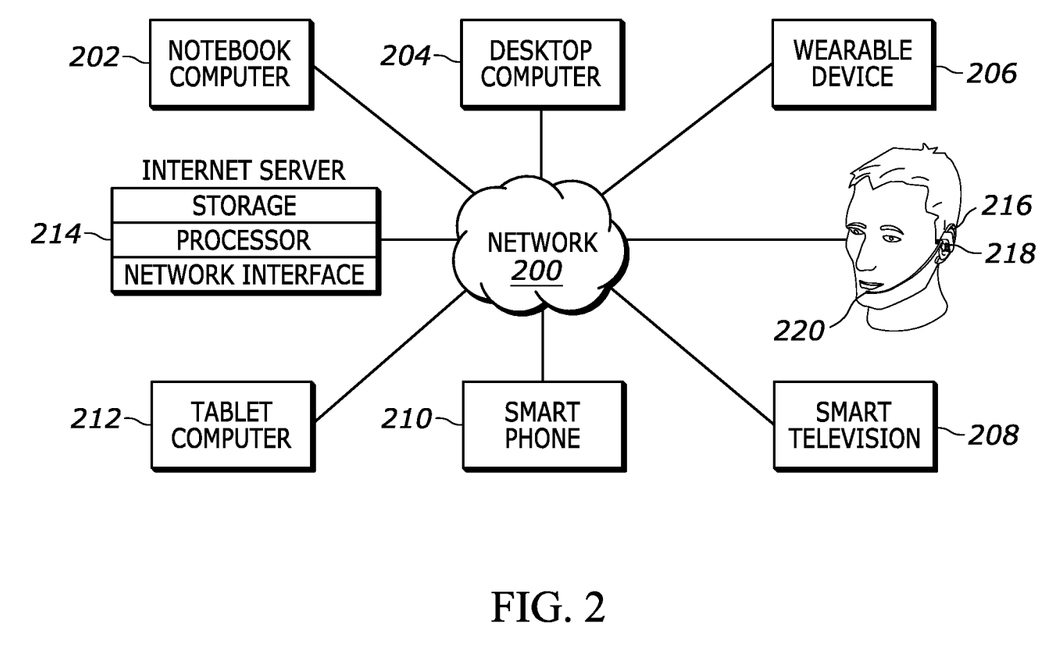
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a Bluetooth headset 216 and a server 214 such as an Internet server that may provide cloud storage accessible to the devices 202-212, 216. It is to be understood that the devices 202-216 may be configured to communicate with each other over the network 200 to undertake present principles.

Describing the headset 216 in more detail, it may be engaged with a person's left or right ear or other portion of the head so that a speaker 218 abuts an ear of the user and a microphone 220 is positioned adjacent to the person's mouth. Thus, the speaker 218 may be used for hearing audio of a VoIP telephone call while a user speaks into the microphone 220 as part of the VoIP call.

Figure 3:
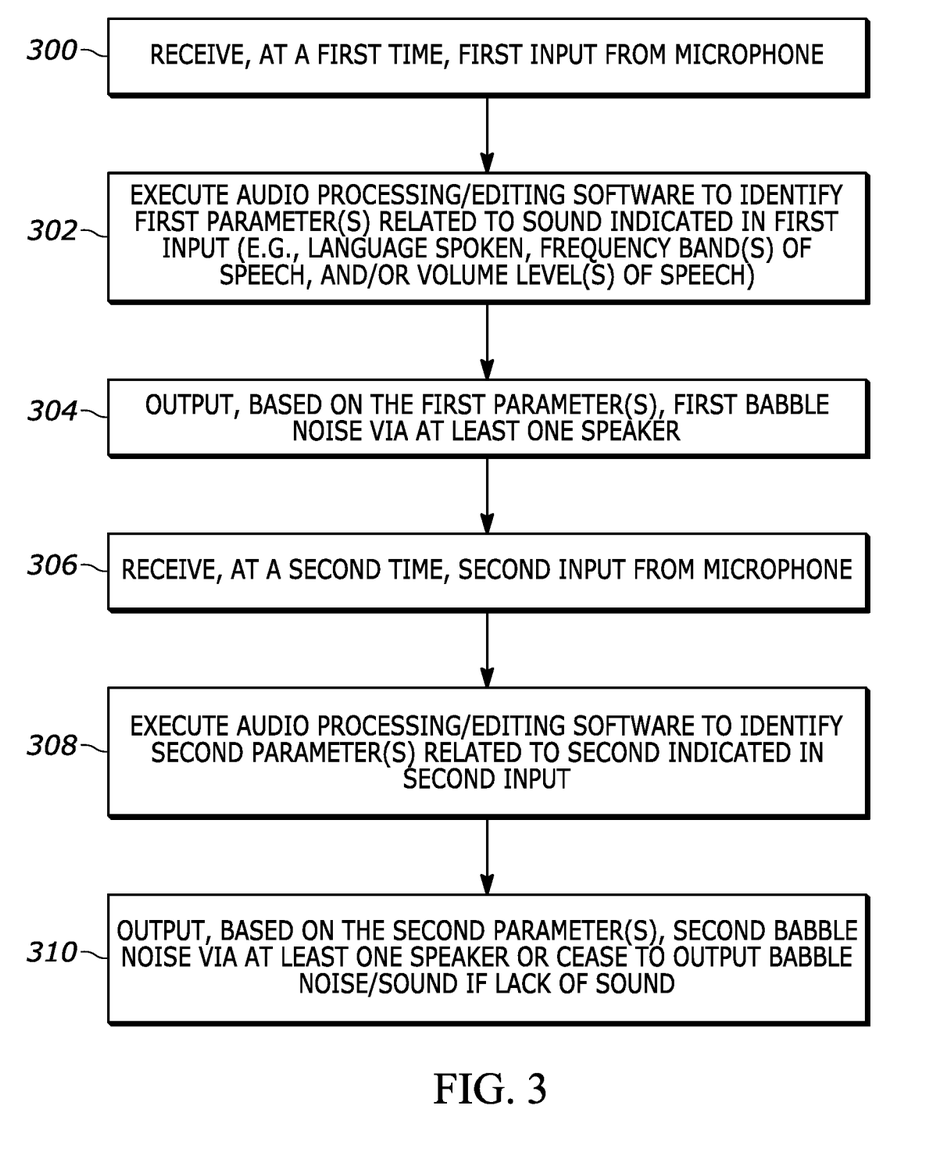
FIG. 3 is a flow chart of an example algorithm that may be used consistent with present principles for outputting babble noise based on one or more parameters.

Referring to FIG. 3, it shows example logic that may be executed by a device such as the system 100 in accordance with present principles for outputting babble noise based on one or more parameters. Beginning at block 300, the device may receive, at a first time, first input from a microphone on or in communication with the device (such as the microphone 191 described above as located on a smart phone or Bluetooth headset in communication with the smart phone).

The logic may then move to block 302 where the device may execute an audio processing and/or editing application or other software to identify one or more first parameters related to sound indicated in the input. The software may be the same as or similar to Adobe's Audition, Audacity, Avid's Pro Tools, etc. The software may also be or include a digital assistant that can identify a language in which speech is spoken as well as the specific words that are being spoken in the speech. The digital assistant may be, for example, Amazon's Alexa, Google's Assistant, or Apple's Siri.

Thus, it is to be understood that one of the first parameters themselves that may be identified at block 302 may include a particular language that is being spoken at the first time as indicated in the microphone input. The language may be English, Chinese, Spanish, or French, for example. Other parameters that might be identified at block 302 may include a particular volume level of the speech (and/or other ambient noise) as detected based on the amplitude of sound waves as detected at the microphone itself, as well as one or more frequency bands in which the speech occurs. The frequency band(s) may be identified using, e.g., a Fourier transform in addition to or in lieu of using the software described above.

For example, if a group of adult males are speaking, the speech for adult males often occurs in the frequency band of 85 Hz to 180 Hz and therefore this band may be identified by the device. If a group of adult females are speaking, the speech for adult females often occurs in the frequency band of 165 Hz to 255 Hz and therefore this band may be identified by the device. If a group of children are speaking, the speech for children often occurs in the frequency band of 250 Hz to 300 Hz and therefore this band may be identified by the device. If a combination of people from the foregoing groups might be speaking amongst each other, at block 302 the device may even identify multiple bands from among the foregoing bands.

From block 302 the logic may then proceed to block 304. At block 304 the device may identify appropriate first babble noise to output based on the detected first parameters, and then output the first babble noise also at block 304. The first babble noise may be output via one or more speakers on or in communication with the device, such as an earpiece speaker on a headset or headphones, or a speaker situated on the user's desk.

From block 304 the logic may proceed to block 306. At block 306 the device may receive, at a second time later than the first time, second input from the microphone. Thereafter, the logic may proceed to block 308 where the device may execute the same audio processing and/or editing software according to the description above to identify one or more second parameters related to sound indicated in the second input rather than as indicated in the first input. From block 308 the logic may then proceed to block 310 where the device may output, based on the second parameter(s) rather than the first parameter(s), second babble noise via the speaker(s).

For example, the second babble noise may be in the same language and/or frequency band as the first babble noise but may be output at a relatively less volume level at the second time than at the first time if the speakers are moving farther away from the location of the microphone itself at the second time. Thus, at block 310 the volume level for the babble noise may be reduced even if the babble noise itself remains the same in terms of language and frequency band.

As another example, the second babble noise may be in a different language than the first babble noise if the people speaking as indicated in the microphone input change the language in which they are speaking, or if a different person or group of people are detected at block 306 as speaking another language than associated with the first babble noise.

As yet another example, the second babble noise may be in a different frequency band than the first babble noise if an adult male was speaking in a group of people adjacent to the microphone and then an adult female from the same or a different group is detected as speaking at block 306.

However, also note that if the second input was determined by the device to indicate no sound, or at least no speech/words specifically even if it indicated other sound like ambient noise or instrumental music, then at block 310 the device may output default babble noise in a default language, frequency band, and/or volume. Alternatively, if the second input did not indicate any sound (or speech specifically), then at block 310 the device may cease to output any babble noise via the speaker (or cease to output any noise at all).

In any case, after block 310 the logic of FIG. 3 may end. Alternatively, the logic may revert back to block 300.

Figure 4:
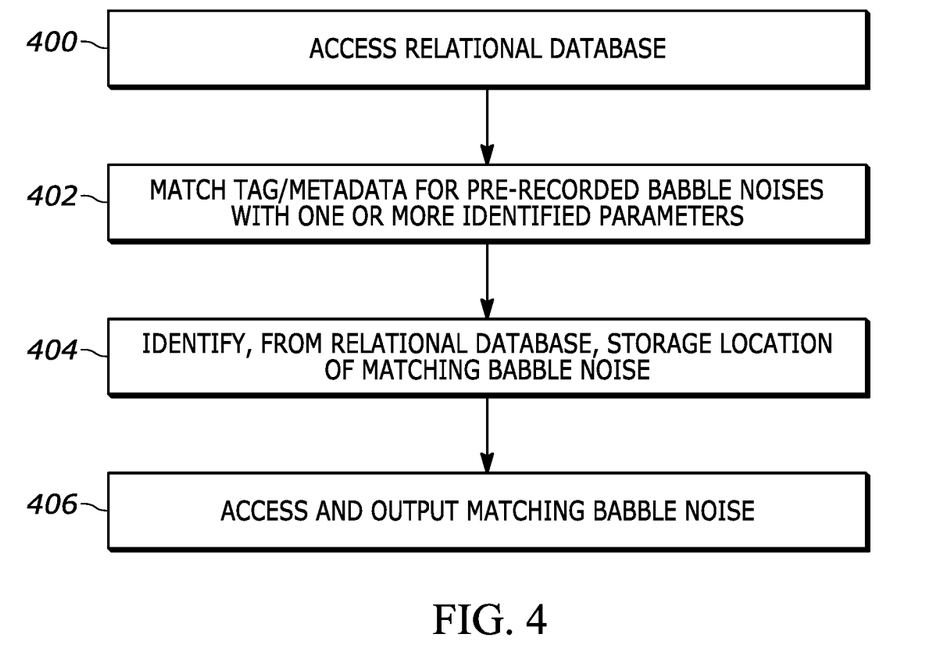
FIGS. 4 and 5 are flows charts of example algorithms that may be used in conjunction with the algorithm of FIG. 3 to determine a babble noise to output.

Continuing the detailed description in reference to FIG. 4, it shows a flow chart of example logic that may be executed by the same device as described above in reference to FIG. 3. FIG. 4 shows example logic that may be executed in conjunction with the logic of FIG. 3 to select a particular babble noise to output based on detected parameters consistent with present principles.

Beginning at block 400, the device may access a relational database correlating particular pre-recorded babble noise tracks or sound files in an electronic library/storage area with respective tags or other metadata related to various parameters that might be identified. For instance, the database may indicate that a first babble noise track is correlated to a first language, and that a second babble noise track is correlated to a second, different language. Some tracks may even be correlated to speech in multiple languages if the speaking of those multiple languages establishes part of the prerecorded babble noise itself. The database may also indicate that the one of the babble noise tracks is correlated to speech in one of the frequency bands described above (or multiple bands of the ones from above) while a second babble noise track is correlated to speech in another frequency band (or multiple bands).

The relational database and its correlations may have been configured or created by a system administrator or other person, and may be stored at the device itself or remotely from it such as at an Internet server to which the device has access. Similarly, the babble noises themselves may have been created/recorded in various languages, generated, classified, and/or stored by the system administrator or other person. Note that the babble noises themselves may have been recorded from indistinguishable crowd or background speech of multiple people in a public or group setting, such as a sporting event, party, concert, etc. where speech is evident but individual conversations or even sentences that are spoken are not discernable owing to the combined noise level of all of the speech that is ongoing.

After block 402, the logic may proceed to block 404 where the device may identify, from the relational database, a storage location of a babble noise that has been matched to the identified parameter(s) using the database. It is to therefore be understood that the relational database may also correlate not just certain parameter(s) with a given pre-recorded babble noise but also a storage location at which that respective babble noise can be accessed to then present it via a speaker on the device.

After block 404 the logic may proceed to block 406. At block 406 the device may navigate to the storage location itself, access the associated babble noise, and output the associated babble noise. Thus, in certain implementations blocks 400-406 may be performed at either of block 304 or block 310 as described above.

Figure 5:
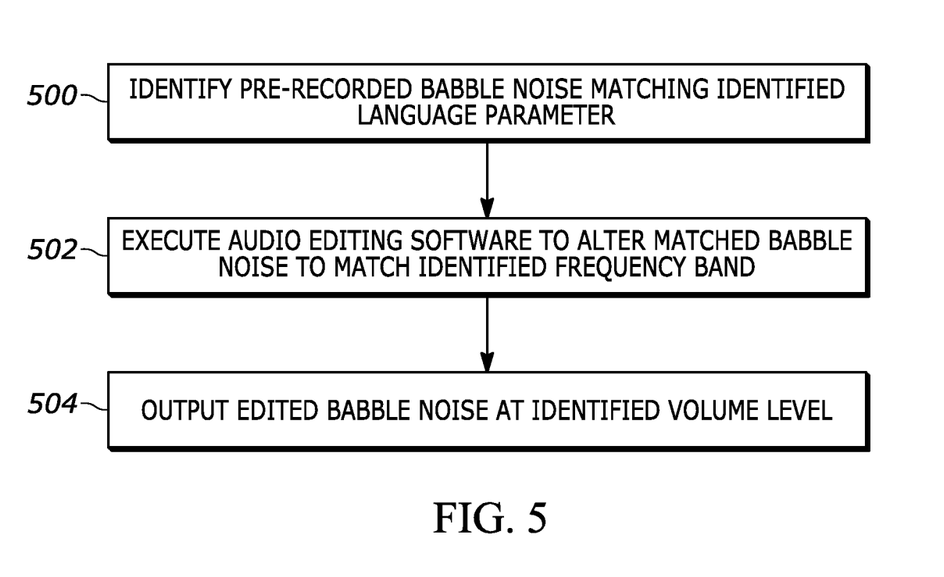

Before moving on to the description of FIG. 5, also note that in some examples a user's microphone might have detected two (or more) separate and distinct conversations or other speech as occurring concurrently, with each conversation being associated with different parameters such as different languages and frequency bands. In such a case, different babble noise tracks that respectively match the different language and frequency band parameters of each conversation may be selected and combined together for concurrent output but, e.g., only at a detected volume level that is the greatest from among the two conversations.

Now in reference to FIG. 5, it shows a flow chart of example logic that may also be executed by the same device as described in reference to FIG. 3. FIG. 5 also shows example logic that may be executed in conjunction with the logic of FIG. 3 to select a particular babble noise to output based on detected parameters as discussed above. However, in contrast to FIG. 4, rather than simply selecting and using a pre-recorded babble noise from among plural recordings that are available to the device, in FIG. 5 the device may select one or more pre-recorded babble noises and then alter them to further conform them to one or more identified parameters before outputting the noise(s) themselves (e.g., as combined according to the description in the paragraph immediately above).

Beginning at block 500, the device may identify/select a pre-recorded babble noise(s) matching an identified language(s). This part of the process may employ the relational database discussed above in reference to FIG. 4.

From block 500 the logic may then proceed to block 502. At block 502 the device may execute audio editing software to alter a babble noise(s) matched in the relational database to the identified language(s). Altering the language-matched babble noise(s) at block 502 may include using a digital equalizer to produce the babble noise(s) in one or more of the identified frequency bands by increasing the gain/volume level for audio in the identified band(s) and reducing the gain/volume level for other bands not identified. Altering the language-matched babble noise(s) at block 502 may also include altering the playback speed (e.g., real-time, faster than real-time, or slower than real-time) or other characteristics to match the cadence of detected speech.

From block 502 the logic may then proceed to block 504. At block 504 the device may output the edited/altered babble noise(s) from block 502 at a volume level that matches the volume level of the speech as detected by the device's microphone (e.g., at least to within a threshold such as within one or two decibels of the volume level as detected). Alternatively, the edited/altered babble noise may be output at a greater volume level than the detected speech, such as a volume level greater by a threshold number of decibels or volume scale increments (e.g., greater by five decibels or two increments on a scale from one to ten). Thus, in certain implementations blocks 500-504 may be performed at either of block 304 or block 310 as described above.

Figure 6:
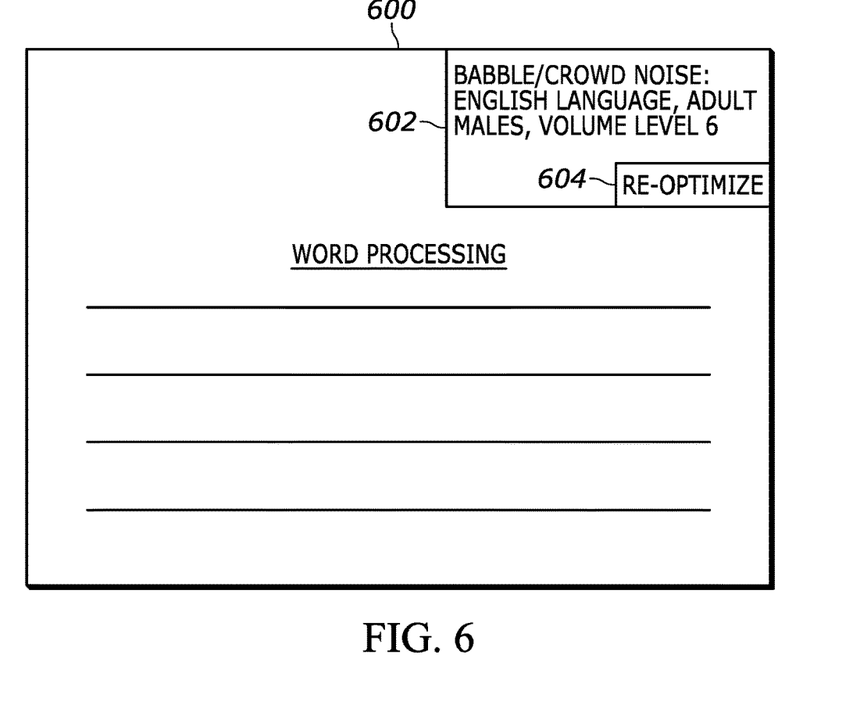
FIG. 6 shows an example graphical user interface (GUI) that may be presented on the display of a device while babble noise is being output by the device.

Now describing FIG. 6, it shows an example graphical user interface (GUI) 600 that may be presented on the display of a device outputting babble noise consistent with present principles. As shown, a word processing document 602 is being presented, though in other examples the content 602 may be a web page as presented through a web browser, an email inbox of an email application, a music player screen, etc.

In any case, an indication 602 of babble noise that is currently being output by the device may be overlaid on the word processing document. As shown, the indication 602 may include an indication of the language to which the produced babble noise pertains, the frequency band or group of individuals that have been identified as speaking (e.g., adult males in this example), and even the volume level at which the babble noise is being output.

As also shown in FIG. 6, in some examples the indication 602 may be accompanied by a selector 604 that may be selectable via touch or cursor input. The selector 604 may be selectable to re-optimize the babble noise that is being produced if the end-user does not feel that it adequately matches the ambient sound conditions of the end-user's area at that time. Thus, for example, selection of the selector 604 may command the device to undertake steps 300-304 described above (or steps 306-310) to refresh the output of babble noise based on parameters that exist or are occurring at the time the user selects the selector 604.

Figure 7:
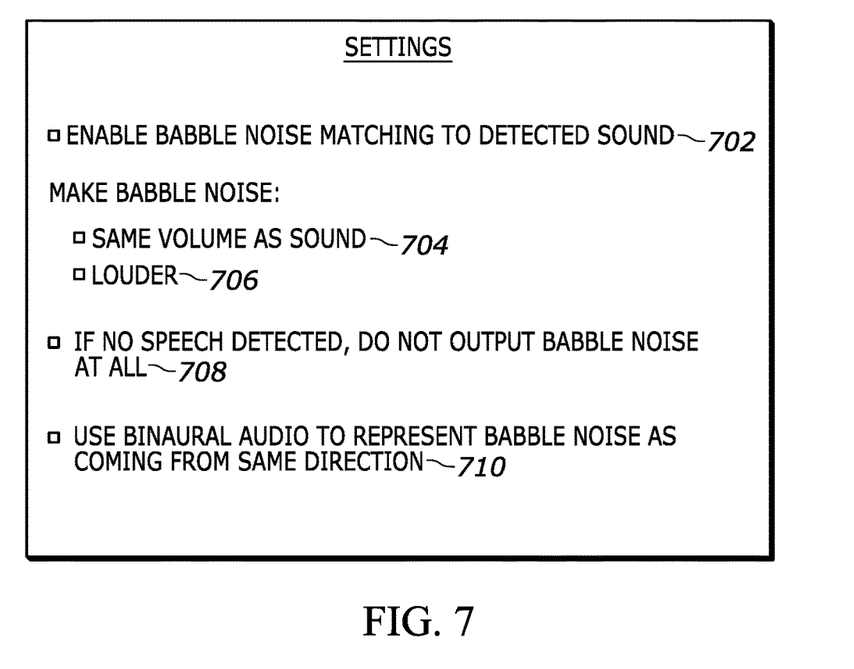
FIG. 7 shows an example GUI for configuring settings of a device that operates consistent with present principles.

Moving on in the detailed description to FIG. 7, it shows an example GUI 700 that may be presented on the display of a device configured to undertake present principles. The GUI 700 may be a settings GUI to configure one or more settings of the device. Each of the options or sub-options to be discussed below may be selected by directing touch or cursor input to the respective check box shown adjacent to the respective option or sub-option.

As shown in FIG. 7, the GUI 700 may include a first option 702 that may be selectable to enable the device to output babble noise that matches one or more detected sound parameters. Thus, for example, selecting the option 702 may set or configure the device to undertake the logic of FIGS. 3-5 described above.

As also shown in FIG. 7, the GUI 700 may include sub-options 704, 706 to respectively set or configure the device to output babble noise at the same volume level as speech as detected by the device's microphone (option 704) or to output babble noise at a greater/louder volume level (option 706). For example, selection of the option 706 may set or configure the device to output babble noise according to the threshold number of decibels discussed above.

FIG. 7 also shows that an option 708 may be presented on the GUI 700. The option 708 may be selectable to set or configure the device to, if no speech is detected via the device's microphone, refrain from outputting any babble noise rather than, e.g., outputting babble noise in a default language, frequency level, and volume regardless of the lack of sound (or speech specifically).

An option 710 is also shown in FIG. 7. Option 710 may be selectable to set or configure the device use binaural audio to represent babble noise produced by the device as coming from the same direction as the associated sound detected by the device's microphone. To do so, an array of microphones oriented on the device (or other hardware) at different angles may be used to identify the direction based on which signal from which microphone indicates the speech at the greatest volume level, and then the direction in which that microphone is facing may be selected as the direction of the source of sound. Binaural audio software may then be used to produce the babble noise as coming/originating from the identified direction, and accordingly left and right speakers on a headset or other audio system may be used for such purposes.

Before concluding, it is to be understood that present principles may apply to situations other than an in-person conversation between two people near a user. For instance, if the user's microphone detects the singing of musical words that are sung in person or in a musical recording, or the speaking of words in an audio recording such as a podcast, present principles may be used to output babble noise to mask the singing or audio recording.

It may now be appreciated that present principles provide for an improved computer-based user interface that improves the functionality and ease of use of the devices disclosed herein for noise masking. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor and comprising instructions executable by the at least one processor to:
   receive, at a first time, first input from at least one microphone accessible to the at least one processor;
   based at least in part on the first input, identify at least a first parameter related to sound indicated in the first input, wherein the first parameter is speech in a first language;
   based on the first parameter, output first babble noise via at least one speaker accessible to the at least one processor, wherein the first babble noise is related to speech in the first language;
   receive, at a second time, second input from the at least one microphone, the second time being different from the first time;
   based at least in part on the second input, identify at least a second parameter related to sound indicated in the second input, the second parameter being different from the first parameter, wherein the second parameter is speech in a second language different from the first language; and
   based on the second parameter, output second babble noise via the at least one speaker, wherein the second babble noise is different from the first babble noise, wherein the second babble noise is related to speech in the second language.

2. The device of claim 1, wherein babble noise is established at least in part by indistinguishable background speech of multiple people.

3. The device of claim 1, wherein the first babble noise is prerecorded.

4. The device of claim 1, wherein the first babble noise is generated dynamically using audio editing software.

5. The device of claim 1, wherein the instructions are executable by the at least one processor to:
based at least in part on the second input, identify from the second input a reduction in sound relative to sound indicated in the first input; and
based on the identification of the reduction in sound, reduce the volume level of babble noise output via the at least one speaker.

6. The device of claim 5, wherein the reduction in sound comprises a lack of sound, and wherein the reduction in volume level comprises ceasing to output any babble noise via the at least one speaker.

7. The device of claim 6, wherein ceasing to output any babble noise via the at least one speaker comprises ceasing to output any sound via the at least one speaker.

8. The device of claim 1, comprising the at least one microphone.

9. A method, comprising
receiving, at a device, input from at least one microphone;
based at least in part on the input, using the device to identify first, second, and third parameters related to sound indicated in the input, the first parameter being related to speech in a first language, the second parameter being related to speech in a first frequency band, and the third parameter being related to speech at a first volume level; and
based on the first, second, and third parameters, outputting first crowd noise via at least one speaker accessible to the device according to the first, second, and third parameters.

10. The method of claim 9, wherein the first crowd noise uses speech in the first language.

11. The method of claim 9, wherein the first frequency band comprises frequencies from 85 Hz to 180 Hz, and wherein the first crowd noise is output in the first frequency band.

12. The method of claim 9, wherein the first frequency band comprises frequencies from 165 Hz to 255 Hz, and wherein the first crowd noise is output in the first frequency band.

13. The method of claim 9, wherein the first frequency band comprises frequencies from 250 Hz to 300 Hz, and wherein the first crowd noise is output in the first frequency band.

14. The method of claim 9, wherein the first crowd noise is output at a second volume level matching the first volume level to within a threshold.

15. At least one computer readable storage medium (CRSM) that is not a transitory signal, the computer readable storage medium comprising instructions executable by at least one processor to:
receive input from at least one microphone accessible to the at least one processor;
based at least in part on the input, identify first, second, and third first parameters related to sound indicated in the input, the first parameter being related to speech in a first language, the second parameter being related to speech in a first frequency band, and the third parameter being related to speech at a first volume level as sensed by the at least one microphone; and
based on the first, second, and third parameters, output first babble noise via at least one speaker accessible to the at least one processor to correspond to the first, second, and third parameters.

16. The device of claim 1, comprising the at least one speaker.

17. The device of claim 8, comprising the at least one speaker.

18. The method of claim 9, wherein the input is first input, wherein first input is received at a first time, wherein the first crowd noise is related to speech in the first language, and wherein the method comprises:
receiving, at a second time, second input from the at least one microphone, the second time being different from the first time;
based at least in part on the second input, using the device to identify a fourth parameter, the fourth parameter being different from the first parameter, wherein the fourth parameter is related to speech in a second language different from the first language; and
based on the fourth parameter, outputting second crowd noise via the at least one speaker, wherein the second crowd noise is different from the first crowd noise, wherein the second crowd noise is related to speech in the second language.

19. The CRSM of claim 15, wherein the input is first input, wherein first input is received at a first time, wherein the first babble noise is related to speech in the first language, and wherein the instructions are executable to:
receive, at a second time, second input from the at least one microphone, the second time being different from the first time;
based at least in part on the second input, identify a fourth parameter related to sound indicated in the second input, the fourth parameter being different from the first parameter, wherein the fourth parameter is related to speech in a second language different from the first language; and
based on the fourth parameter, output second babble noise via the at least one speaker, wherein the second babble noise is different from the first babble noise, and wherein the second babble noise is related to speech in the second language.

20. The CRSM of claim 15, wherein the instructions are executable to:
use binaural audio to output the first babble noise as coming from a same direction as the sound.

* * * * *